United States Patent
Lurie et al.

(10) Patent No.: US 10,864,608 B2
(45) Date of Patent: Dec. 15, 2020

(54) WORK PIECE PROCESSING DEVICE WITH SERVO-ELASTIC ACTUATOR SYSTEM WITH COMPLIANCE ELASTIC MEMBER AND WEIGHT COMPENSATION ELASTIC MEMBER

(71) Applicant: Branson Ultrasonics Corporation, Danbury, CT (US)

(72) Inventors: Samuel Lurie, Poughquag, NY (US); Thomas Gabre, New Milford, CT (US); Scott Caldwell, New Milford, CT (US); Mark Urbin, Poughkeepsie, NY (US)

(73) Assignee: Branson Ultrasonics Corporation, Danbury, CT (US)

( * ) Notice: Subject to any disclaimer, the term of this patent is extended or adjusted under 35 U.S.C. 154(b) by 138 days.

(21) Appl. No.: 16/156,456

(22) Filed: Oct. 10, 2018

(65) Prior Publication Data

US 2019/0262956 A1 Aug. 29, 2019

Related U.S. Application Data

(60) Provisional application No. 62/636,366, filed on Feb. 28, 2018.

(51) Int. Cl.
  *B23Q 3/157* (2006.01)
  *B23Q 3/16* (2006.01)
  (Continued)

(52) U.S. Cl.
  CPC ............. *B23Q 3/16* (2013.01); *B23K 20/10* (2013.01); *B23K 20/106* (2013.01); *B23K 26/21* (2015.10);
  (Continued)

(58) Field of Classification Search
  CPC ... B23Q 3/16; B23Q 3/18; B23Q 5/00; B23Q 5/12; B23K 20/10; B23K 37/00
  See application file for complete search history.

(56) References Cited

U.S. PATENT DOCUMENTS 4,791,588 A * 12/1988 Onda ................... G05B 19/423
                                                                  700/260
4,817,848 A    4/1989 Gabaldon
(Continued)

FOREIGN PATENT DOCUMENTS

DE   112013001015 T5   11/2014
EP        1849569 A2   10/2007
(Continued)

OTHER PUBLICATIONS

U.S. Appl. No. 15/343,612, filed Nov. 4, 2016, Scott Caldwell et al.
(Continued)

*Primary Examiner* — Lee D Wilson
(74) *Attorney, Agent, or Firm* — Harness, Dickey & Pierce, P.L.C.

(57) ABSTRACT

A work piece processing device includes a tool device, a work piece holder and a servo-elastic actuator system having simultaneous precision force and position control that moves one of the tool device and the work piece holder to the other of the tool device and work piece holder. The servo-actuator system including a servo-actuator, a compliance elastic member and a weight compensation elastic member disposed in a force transmission path with the compliance elastic member and the weight compensation elastic member disposed with respect to each other so that a spring force exerted by the weight compensation elastic member is opposed to a spring force exerted by the compliance elastic member.

13 Claims, 9 Drawing Sheets

(51) Int. Cl.
  *B23K 37/04*     (2006.01)
  *B23Q 17/00*    (2006.01)
  *B23Q 3/06*      (2006.01)
  *B23Q 17/09*    (2006.01)
  *B23K 26/70*    (2014.01)
  *B23Q 15/12*    (2006.01)
  *B23K 37/00*    (2006.01)
  *G05B 19/19*    (2006.01)
  *B23K 31/02*    (2006.01)
  *B23K 20/10*    (2006.01)
  *B23K 26/21*    (2014.01)

(52) U.S. Cl.
  CPC ............ *B23K 26/702* (2015.10); *B23K 31/02* (2013.01); *B23K 37/00* (2013.01); *B23K 37/04* (2013.01); *B23Q 3/06* (2013.01); *B23Q 15/12* (2013.01); *B23Q 17/005* (2013.01); *B23Q 17/0952* (2013.01); *G05B 19/19* (2013.01); *G05B 2219/41251* (2013.01); *G05B 2219/49127* (2013.01)

(56) References Cited

U.S. PATENT DOCUMENTS

| | | | |
|---|---|---|---|
| 5,110,381 A * | 5/1992 | Heckard | B29C 66/92211 156/64 |
| 5,650,704 A | 7/1997 | Pratt et al. | |
| 8,663,077 B2 * | 3/2014 | Katoh | B23Q 7/045 483/14 |
| 8,720,516 B2 | 5/2014 | Klinstein et al. | |

FOREIGN PATENT DOCUMENTS

| | | |
|---|---|---|
| EP | S62119610 A | 10/2007 |
| JP | 2013063521 A | 4/2013 |
| JP | 5779761 B2 | 9/2015 |
| WO | WO-2017130911 A1 | 8/2017 |

OTHER PUBLICATIONS

International Search Report and Written Opinion regarding PCT/US2019/018759, dated Jul. 15, 2019.

* cited by examiner

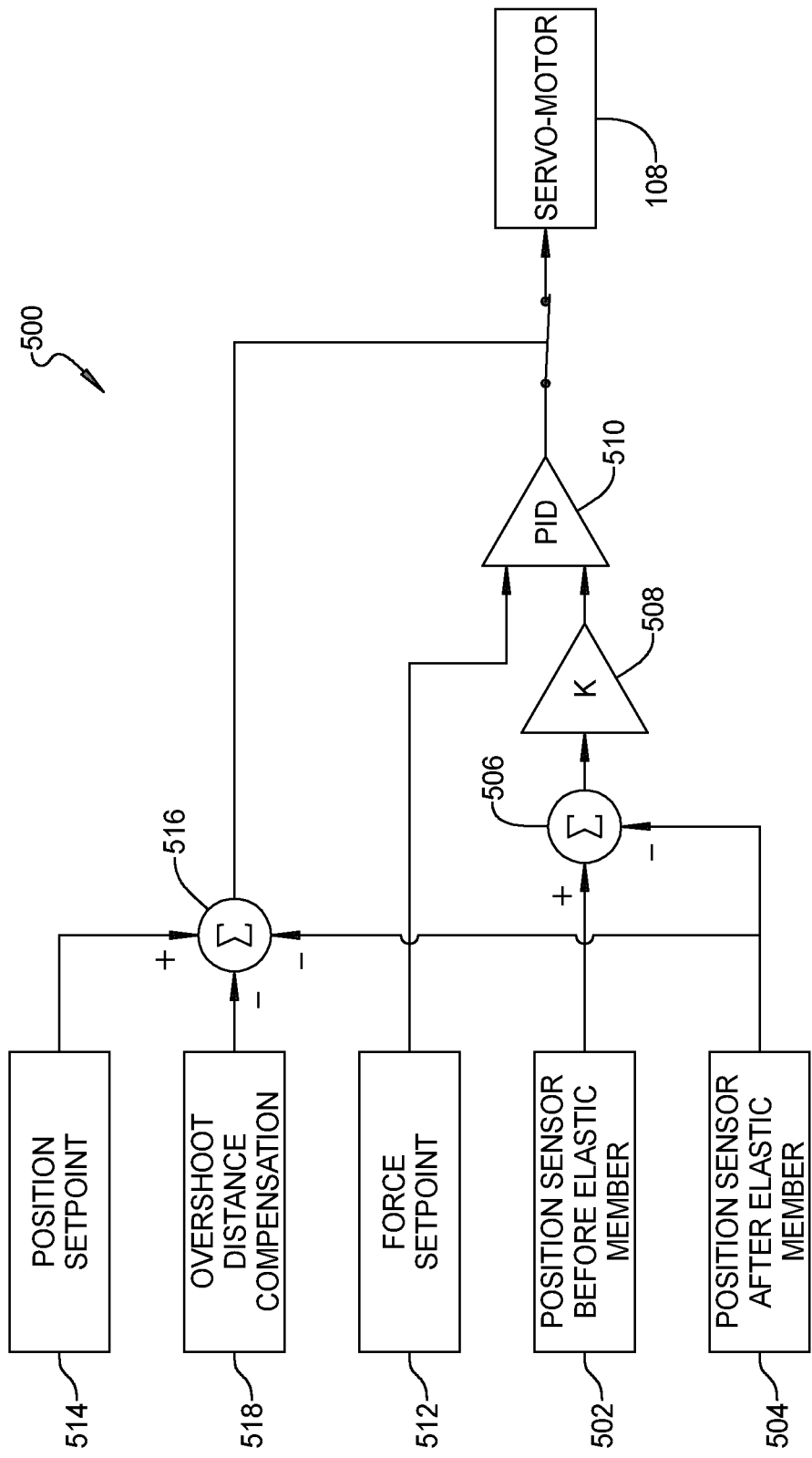

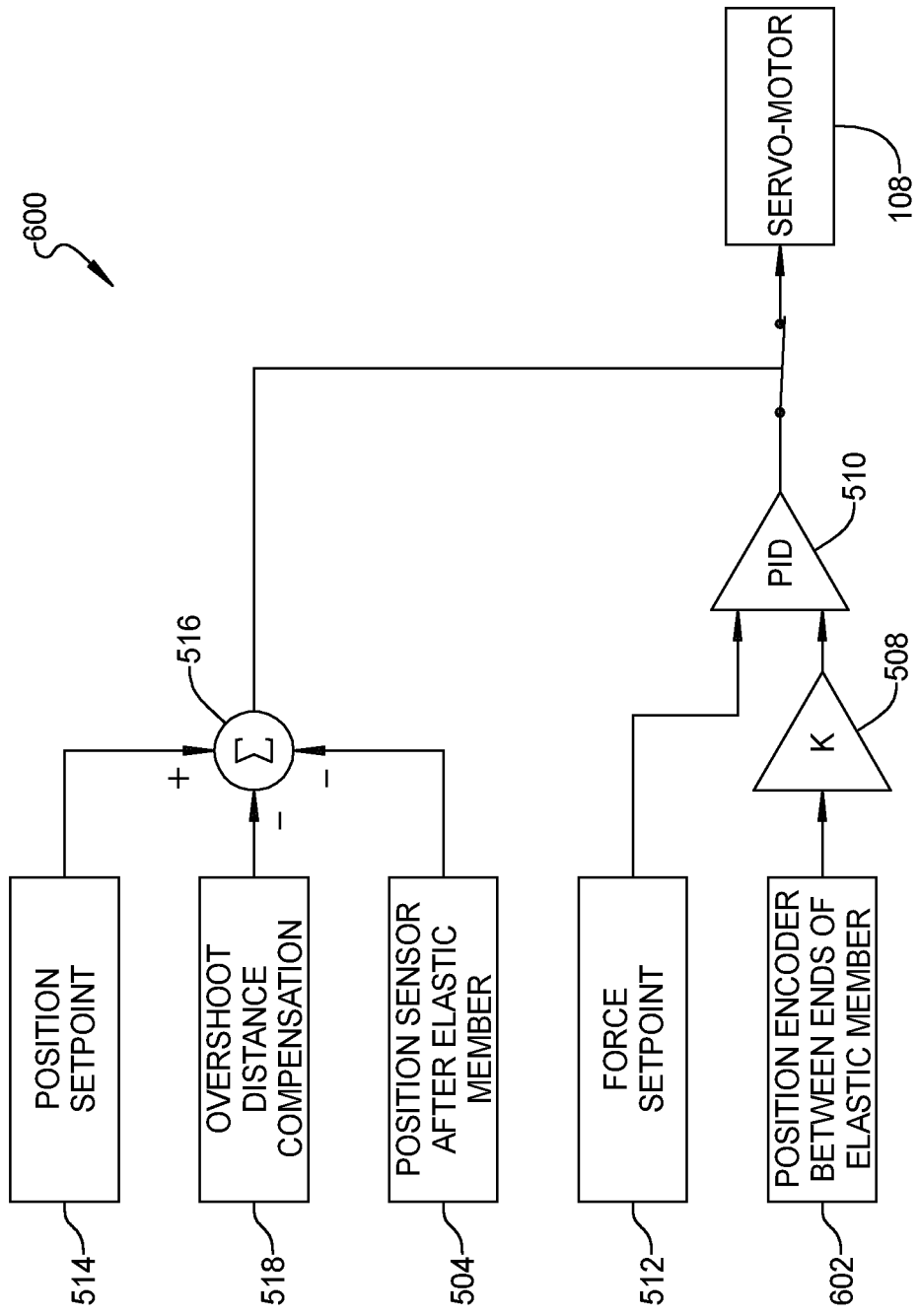

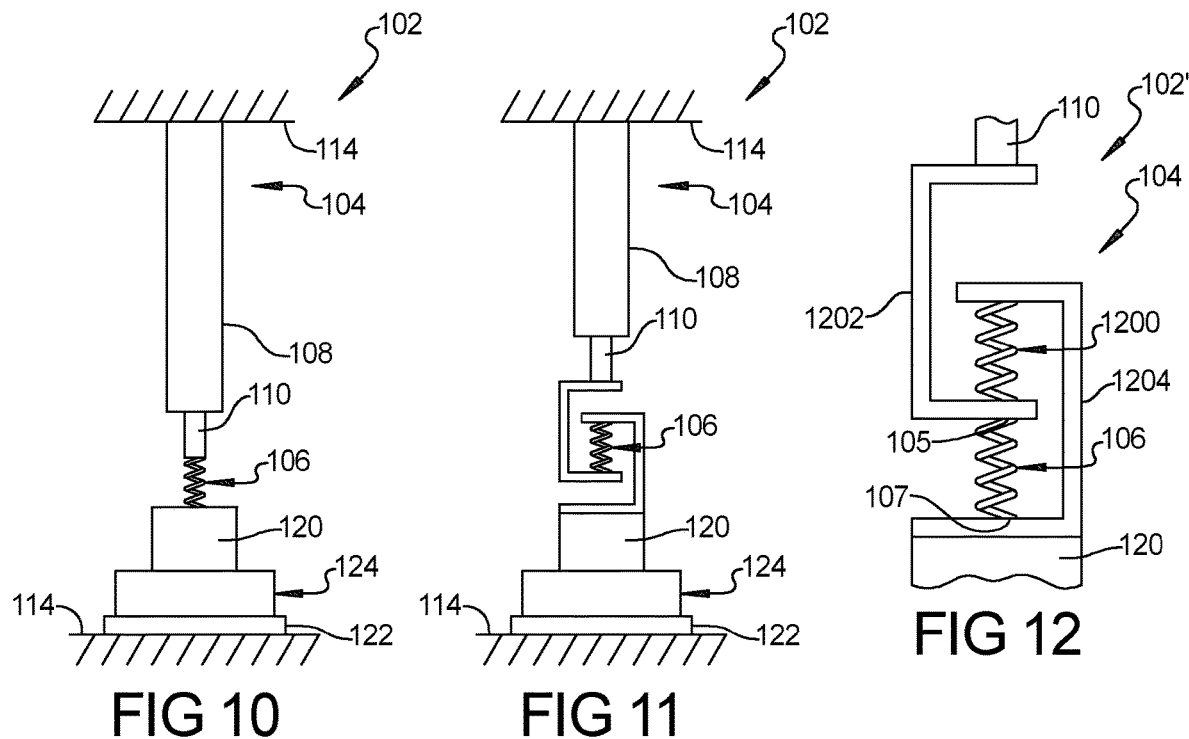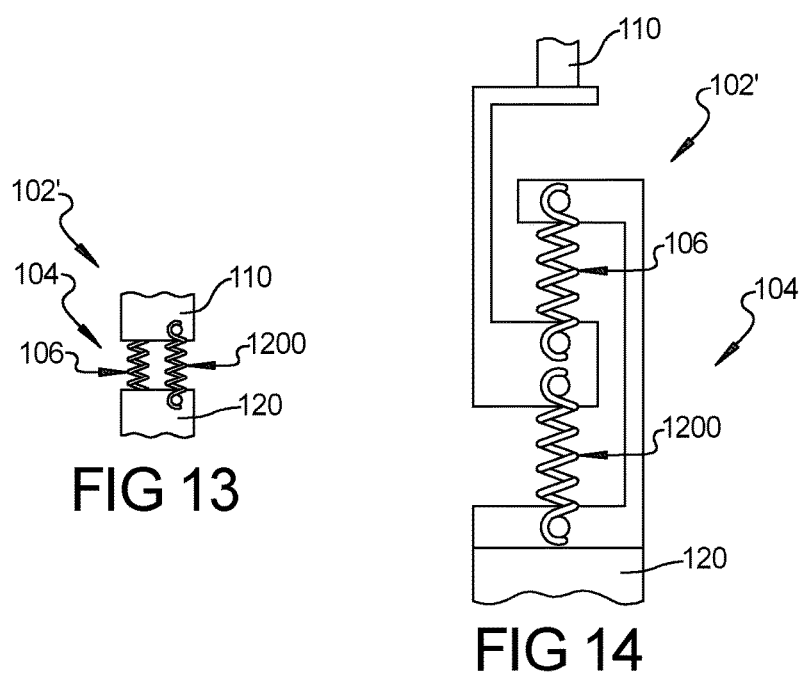

WORK PIECE PROCESSING DEVICE WITH SERVO-ELASTIC ACTUATOR SYSTEM WITH COMPLIANCE ELASTIC MEMBER AND WEIGHT COMPENSATION ELASTIC MEMBER

CROSS-REFERENCE TO RELATED APPLICATIONS

This application claims the benefit of U.S. Provisional Application No. 62/636,366, filed on Feb. 28, 2018. The entire disclosure of the above application is incorporated herein by reference.

FIELD

The present disclosure relates to a work piece processing device with a servo-elastic actuator system having simultaneous precision force and position control a weight compensating elastic member.

BACKGROUND

This section provides background information related to the present disclosure which is not necessarily prior art.

Work piece processing devices as used herein are devices that apply force to a work piece (or work pieces) during processing of the work piece. In some devices, the force is part of and contributes to the performance of the work on a work piece (or work pieces), such as in welding, and in other cases, the force is not part of the performance of the work on the work piece but rather is applied to clamp the work piece in place as the work is performed on the work piece. Such work processing devices have actuators that apply the force to the work pieces such as by moving a tool against the work piece or applying a clamp to the work piece to hold it in place during processing. Such work piece processing devices can include devices for ultrasonic, vibration, laser, thermal, spin or infrared processing of plastics or metal where force is applied to the work piece, such as welding, staking, swaging, and cutting. Work piece processing devices that apply force to the work piece during processing need actuators that can control both force and position.

Pneumatic actuators are good at providing a constant force regardless of the actuator's position when in contact with a relatively stiff surface, but are not very precise at controlling position. Servo-actuators on the other hand are precise at controlling position but not that good at controlling force when in contact with a relatively non-compliant or stiff surface. A servo-actuator is a mechanism that provides position controlled motion in a mechanical system in response to an electrical input signal using feedback of an output of the servo actuator for position control.

Use of servo-actuators for ultrasonic welding, vibration welding, laser welding, thermal welding, spin welding, infrared welding and ultrasonic cutting could control position very accurately, on the order of a thousandth of an inch, but could not control force to under plus or minus 40 pounds. The problem arises from the relative non-compliance of the material of the work piece being pressed against during welding. Even though the servo-actuators can resolve the position to within a thousandth of an inch, this small relative motion, given the stiffness of the material being pressed against, results in a large change in force—on the order of about 40 pounds for a typical piece of plastic, and even higher for a piece of metal. This problem of force to position sensitivity is inherent with servo-actuators when pushing against a relatively non-compliant surface, regardless of how good the control system is for the servo-actuator.

Servo actuators often have a torque control mode that gives a degree of control of the force, such as that described in U.S. Pat. No. 8,720,516 for "Ultrasonic Press Using Servo Motor with Delayed Motion." But again, because of the noncompliance of the surface being pushed against, the force varies by a high percentage of the total load.

One well understood method in the prior art to control force precisely with a servo-actuator is to have the servo-actuator press against a long travel spring. This gives very good force control, but does not have any position control. U.S. Pat. No. 4,817,848 for "Compliant Motion Servo" discloses the use of a long travel spring with a servo-actuator to control force, but switches over to a closed loop position control at the end of motion, and therefore loses control of force at the end of the process.

JP2013-063521 for an "Ultrasonic Welding Device, Ultrasonic Welding Method, Wiring Device" discloses an ultrasonic welding which performs ultrasonic welding by pressing a tool horn 44 attached to an ultrasonic sliding unit 40 slidable relative to a body frame 10 against a workpiece that includes a first linear scale 50 for measuring a moving amount of the tool horn 44, a compression spring pressing the ultrasonic sliding unit, a driving means 28 compressing the compression spring, a second linear scale 51 measuring a compressed amount of the compression spring, and a load cell 45 measuring a pressing force by the compression spring. When compressing the compression spring by driving the driving means 28, the pressing force by the compression spring measured by the load cell 45, the moving amount of the tool horn measured by the first linear scale 50, and the compressed amount of the compression spring measured by the second linear scale 51 are fed back to the driving means 28 and controlled to perform ultrasonic welding while imparting an optional pressing force to the workpiece. However, when the compression spring can only be in compression, the weight of the tool horn and carriage bottom out and the system isn't able to distinguish forces exerted on the workpieces being welded at forces below the weight load of the tool horn and carriage.

In many processes, there is a need for precise force control of actuation, while maintaining precise position control. Specifically, in ultrasonic, vibration, laser, thermal, spin or infrared processing of plastics or metal where force is applied to the work piece, such as welding, staking, swaging, and cutting, there is a need for simultaneous precise force control and position control of actuation.

SUMMARY

This section provides a general summary of the disclosure, and is not a comprehensive disclosure of its full scope or all of its features.

In accordance with an aspect of the present disclosure, a work piece processing device includes a tool device, a work piece holder and a servo-elastic actuator system having simultaneous precision force and position control that moves one of the tool device and the work piece holder to the other of the tool device and work piece holder. The servo-actuator system including a servo-actuator, a compliance elastic member and a weight compensation elastic member disposed in a force transmission path with the compliance elastic member and the weight compensation elastic member disposed with respect to each other so that a spring force exerted by the weight compensation elastic member is opposed to a spring force exerted by the compliance elastic member.

In an aspect, the compliance elastic member is either in compression or tension and the weight compensation elastic member is also in either compression or tension.

In an aspect, the work piece holder is disposed below the servo-actuator and the compliance elastic member and the weight compensation elastic member are disposed between the servo-actuator and the tool device and the weight compensation elastic member is disposed to support a weight of the tool device.

In an aspect, the work piece holder is disposed below the servo-actuator and the compliance elastic member and the weight compensation elastic member are disposed between the servo-actuator and a frame of the work piece processing device and the weight compensation elastic member is disposed to support a weight of the servo-actuator and the tool device.

In an aspect, the work piece holder is disposed above the servo-actuator and the weight compensation elastic member is disposed to support a weight of the work piece holder.

In accordance with an aspect, a controller is coupled to the servo-actuator wherein the controller is configured to control movement of the servo-actuator to an end position based on force being applied to a work piece held by the work piece holder and a force set-point, moving the servo-actuator to maintain the force being applied to the work piece at the force set-point once the force being applied to the work piece reaches the force set-point, and stopping movement of the servo-actuator when the servo-actuator reaches a maximum travel.

In accordance with an aspect, the controller is configured to determine the force being applied to the work piece as the compliance elastic member in combination with the weight compensation elastic member is deflected based on a spring deflection of these two elastic members.

In accordance with an aspect, first and second position sensors are disposed on opposite sides of the combination of the compliance elastic member and the weight compensation elastic member and coupled to the controller. The controller is configured to determine the spring deflection of the combination of these two elastic members based on positions sensed by the first and second position sensors as these two elastic members are deflected by movement of the servo-actuator.

In accordance with an aspect, a position sensor is disposed between opposed ends of the combination of the compliance elastic member and weight compensation elastic member that senses the spring deflection of the combination of these two elastic members as these two elastic members are deflected. The position sensor is coupled to the controller.

In accordance with an aspect, a force sensor is coupled to the controller that senses the force being applied to the work piece. In accordance with an aspect, the force sensor is a torque sensor that senses torque applied between the servo-motor and the actuator member.

In accordance with an aspect, the controller is configured to limit maximum travel of the servo-actuator based on a position sensed by a position sensor and a position set-point.

In an aspect, the controller is configured to limit maximum travel of the servo-actuator based on an overshoot distance compensation as well as the position sensed by the position sensor and the position set-point.

In an aspect, the work piece processing device is any of an ultrasonic welder, a vibration welder, a laser welder, a thermal welder, a spin welder, an infrared welder, or an ultrasonic cutter.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure. The orientation of the drawings are not intended to limit the actual orientation of the servo-elastic actuator system relative to the work piece being processed. Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

FIG. 1A is simplified schematic view of a work piece processing device having a servo-elastic actuator system shown in FIG. 1A of U.S. Ser. No. 15/343,612;

FIG. 1B is a simplified schematic view of a work piece processing device having a variation of the servo-elastic actuator system of FIG. 1A as shown in FIG. 1B of U.S. Ser. No. 15/343,612;

FIG. 2 is simplified schematic view of a work piece processing device having another servo-elastic actuator system as shown in FIG. 2 of U.S. Ser. No. 15/343,612;

FIG. 3 is simplified schematic view of a work piece processing device having another servo-elastic actuator as shown in FIG. 3 of U.S. Ser. No. 15/343,612;

FIG. 4 is simplified schematic view of a work piece processing device having another servo-elastic actuator system as shown in FIG. 4 of U.S. Ser. No. 15/343,612;

FIG. 5 is a control diagram of control logic as shown in FIG. 5 of U.S. Ser. No. 15/343,612 for controlling a servo-actuator of the servo-elastic actuator systems of any of FIGS. 1A, 1B-4;

FIG. 6 is a control diagram of control logic shown in FIG. 6 of U.S. Ser. No. 15/343,612 that is a variation of the control logic of FIG. 5;

FIG. 7 is a control diagram of art control logic shown in FIG. 7 of U.S. Ser. No. 15/343,612 that is another variation of the control logic of FIG. 5;

FIG. 8 is a flow chart of control logic shown in FIG. 8 of U.S. Ser. No. 15/343,612 for determining an offset distance compensation;

FIG. 9 is a simplified schematic view of a work piece processing device having another servo-elastic actuator system as shown in FIG. 9 of U.S. Ser. No. 15/343,612;

FIG. 10 is simplified schematic view of the work piece processing device of FIG. 1 with a compliance elastic member in compression only;

FIG. 11 is simplified schematic view of the work piece processing device of FIG. 1 with the compliance elastic member in tension only;

FIG. 12 is a simplified schematic view of a portion of a work piece processing device having a servo-elastic actuator system with a compliance elastic member in compression only and a weight compensation elastic member in compression only in accordance with an aspect of the present disclosure;

FIG. 13 is a simplified schematic view of a portion of a work piece processing device having a servo-elastic actuator system with a compliance elastic member in compression only and a weight compensation elastic member in tension only in accordance with an aspect of the present disclosure;

FIG. 14 is of a portion of a work piece processing device having a servo-elastic actuator system with a compliance elastic member in tension only and a weight compensation elastic member in tension only in accordance with an aspect of the present disclosure;

Figure 16:
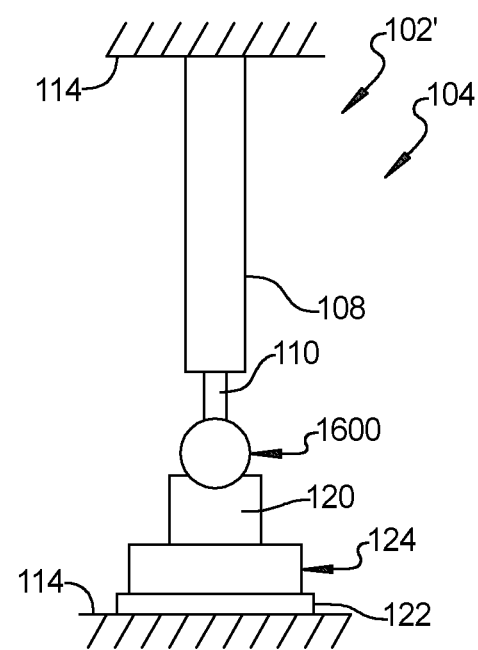
Figure 17:
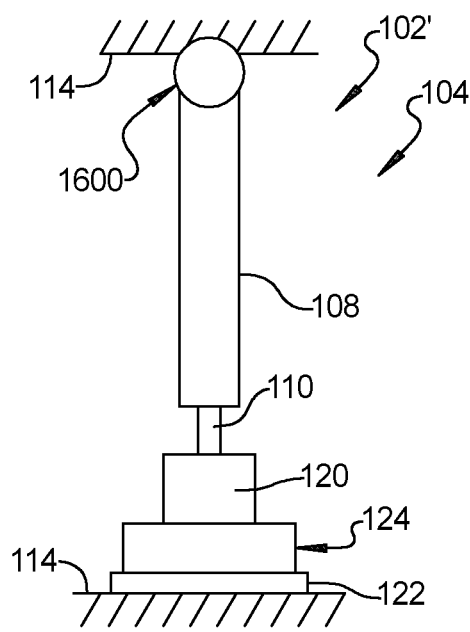
Figure 18:
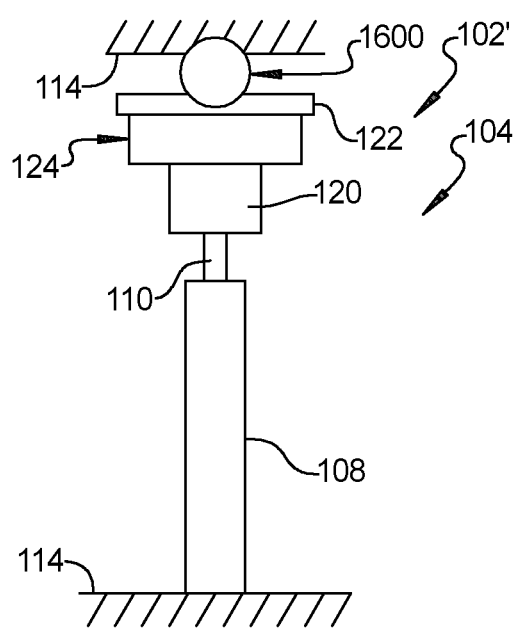
Figure 19:
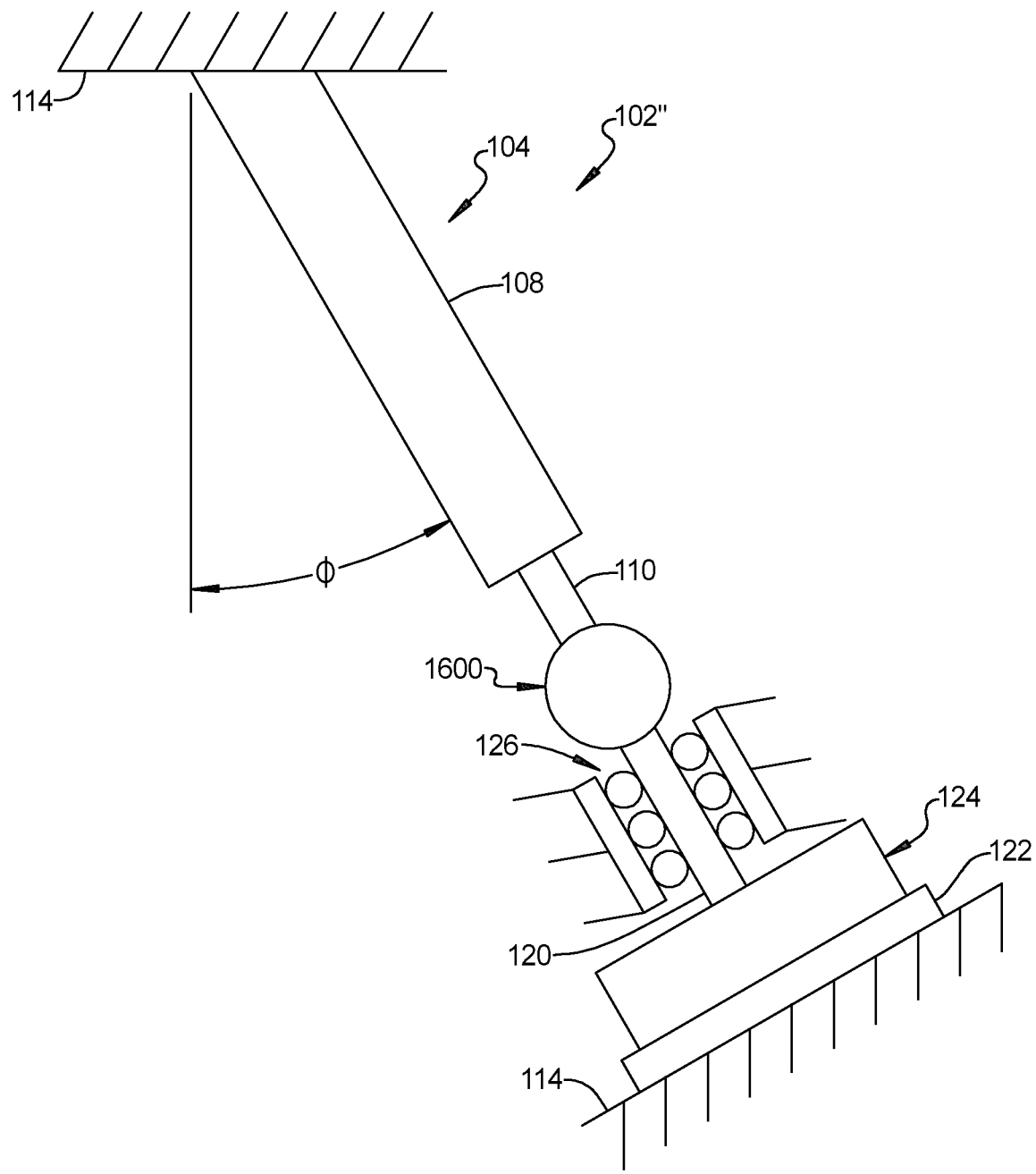

FIG. 16 is a simplified schematic of a work piece processing device having a servo-elastic actuator system with an elastic member combination located between a servo-actuator and a tool device in accordance with an aspect of the present disclosure; and FIG. 17 is a simplified schematic of a work piece processing device having a servo-elastic actuator system with an elastic member combination located between a servo-actuator and a frame in accordance with an aspect of the present disclosure; and FIG. 18 is a simplified schematic of a work piece processing device having a servo-elastic actuator system with an upwardly directed servo-actuator with an elastic member combination above a work piece holder in accordance with an aspect of the present disclosure; and FIG. 19 is a simplified schematic of a work piece processing device having a servo-elastic actuator system in an angular orientation with an elastic member combination located between a servo-actuator and a tool device in accordance with an aspect of the present disclosure.

Corresponding reference numerals indicate corresponding parts throughout the several views of the drawings.

DETAILED DESCRIPTION

Example embodiments will now be described more fully with reference to the accompanying drawings.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a member, component, element or layer is referred to as being "on," "engaged to," "connected to," or "coupled to" another member, component, element or layer, it may be directly on, engaged, connected or coupled to the other member, component, element or layer, or intervening components, members, elements or layers may be present. In contrast, when a member, component, element or layer is referred to as being "directly on," "directly engaged to," "directly connected to," or "directly coupled to" another member, component, element or layer, there may be no intervening members, components, elements or layers present. Other words used to describe the relationship between members, components, elements or layers should be interpreted in a like fashion (e.g., "between" versus "directly between," "adjacent" versus "directly adjacent," etc.).

U.S. Ser. No. 15/343,612 for "Work Piece Processing Device with Servo-Elastic Actuator System with Simultaneous Precision Force and Position Control" (the entire disclosure of which is incorporated herein by reference) discloses various configurations of a work piece processing device that has a servo-elastic actuator system having simultaneous precision force and position control that moves a tool device or work piece holder to the other of the tool device and work piece holder. The servo-elastic actuator system applies force to a work piece during processing of the work piece. The servo-elastic actuator system includes an elastic member, such as a spring or elastomer, mechanically disposed with a servo-actuator in a force transmission path to create additional compliance in the system in order to adjust force versus position sensitivity ratio. This allows the force to be controlled accurately with the servo-actuator, while retaining accurate position control. In should be understood that the force transmission path can be a linear force path or a rotational force transmission path (that is, a torque transmission path).

The servo-actuator controls position to a given precision. The spring constant of the elastic member if using a linear spring constant is chosen to achieve a certain force precision by the following equation:

$$K = \Delta F/\Delta x \quad (1)$$

where:
K=spring constant of elastic member;
ΔF=precision of force; and
Δx=given precision of position of servo-actuator.

If using a torsional spring constant, the torsional spring constant is chosen to achieve a certain torque precision by the following equation:

$$K_\theta = \Delta T/\Delta\theta \quad (2)$$

where:
$K_\theta$=spring constant of spring or elastomer;
ΔT=precision of torque; and
Δθ=precision of angular revolution.

In an embodiment, the elastic member is in series with the servo-actuator relative to the frame, discussed in more detail below with reference to FIGS. 1A, 1B-3, or in parallel with the servo-actuator on the frame itself, discussed in more detail below with reference to FIG. 4. In each case, the elastic member is in series with the servo-actuator in a force transmission path and the overall spring constant is reduced relative to the surface being pushed against to raise the force sensitivity of the servo-actuator.

FIGS. 1-4 show different example embodiments of such work piece processing devices having servo-elastic actuator systems. The work piece processing devices can be any device that applies force to the work piece during processing. The work piece processing devices can, for example, be devices for ultrasonic, vibration, laser, thermal, spin or infrared processing of plastics or metal where force is applied to the work piece, such as welding, staking, swaging, and cutting. The work piece processing systems can also be devices where force is applied to the work piece to hold it in place during processing.

Figure 1A:
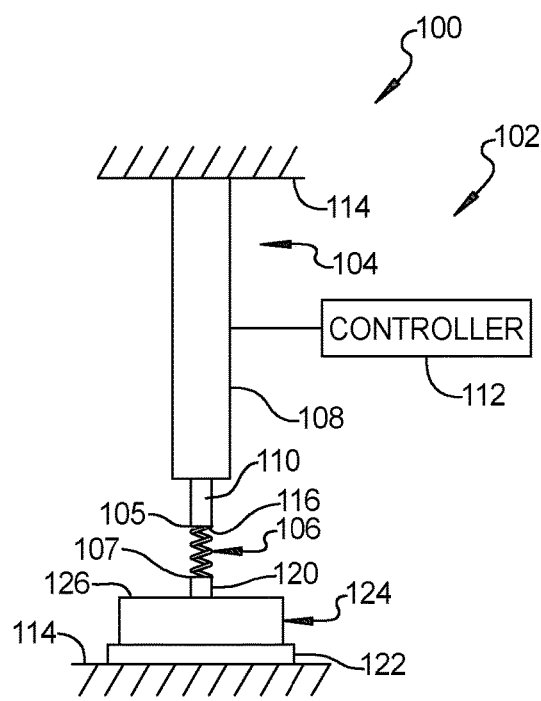

With reference to FIG. 1A, a work piece processing device 100 includes a servo-elastic actuator system 102. Servo-elastic actuator system 102 includes a servo-actuator 104 and elastic member 106. Servo-actuator 104 includes a servo-motor 108 and an actuator member 110 coupled to servo-motor 108 that is moved up and down (as oriented in the drawings) by servo-motor 108. Servo-motor 108 is coupled to a controller 112 that controls servo-motor 108. Servo-motor 108 is affixed to a frame 114 of device 100. An end 105 of elastic member 106 is affixed to an end 116 of actuator member 110 and an opposite end 107 of elastic member 106 is affixed to a tool device 120. Device 100 also includes a work piece holder 122, which for example could be an anvil of an ultrasonic welder or ultrasonic tube sealer. Work piece holder 122 is affixed to frame 114 of device 100. A work piece 124, which has a relatively non-compliant or stiff surface 126, is situated on work piece holder 122. Work piece 124 is a work piece that is to be processed by device 100. Work piece 124 can for example be two plastic or metal pieces that are to be ultrasonically welded together when device 100 is an ultrasonic welder. Work piece 124 can for example be a tube that is to have an end ultrasonically sealed when device 100 is an ultrasonic tube sealer. Tool device 120 is that part of work piece processing device that is pressed against work piece 124 by the movement of servo-actuator 104 to process work piece 124. Tool device 120 may for example be an ultrasonic stack of an ultrasonic welder or an ultrasonic sealer and a tip of an ultrasonic horn of the ultrasonic stack is what physically contacts work piece 124. In such cases, tool device 120 is energized ultrasonically to work on work piece 124 to process it, such by ultrasonic welding or ultrasonic sealing, as applicable.

Figure 1B:
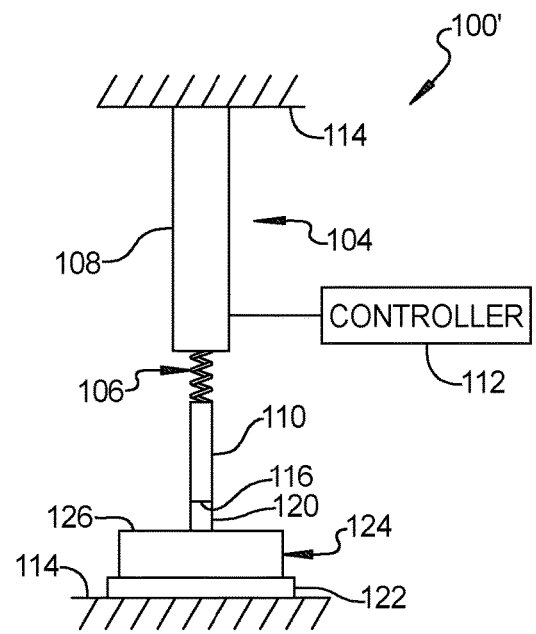

In FIG. 1B, work piece processing device 100' has elastic member 106 disposed between actuator member 110 and servo motor 108. Otherwise, work piece processing device 100' is the same as device 100 in FIG. 1A.

Figure 2:
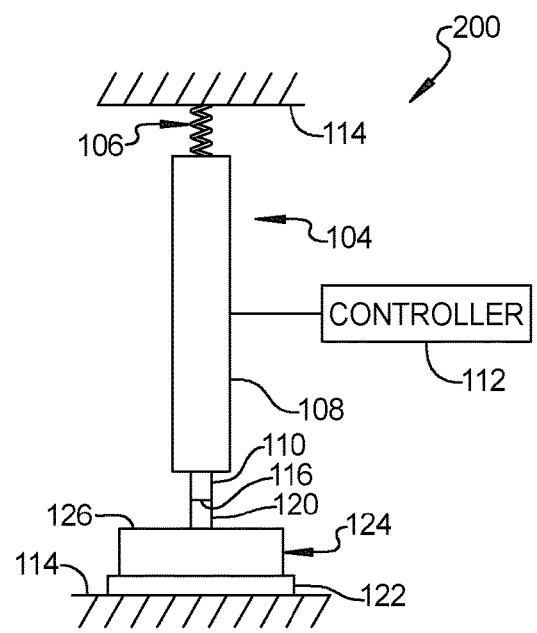

In FIG. 2, work piece processing device 200 has elastic member 106 disposed between servo-motor 108 of servo-actuator 104 and frame 114 and tool device 120 is affixed to end 116 of actuator member 110. Otherwise, work piece processing device 200 is the same as work piece processing device 100.

Figure 3:
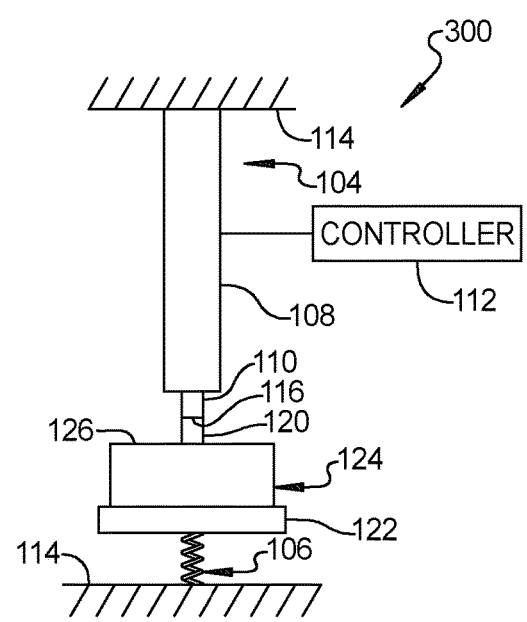

In FIG. 3, work piece processing device 300 has elastic member 106 disposed between work piece holder 122 and frame 114 of work piece processing device 300. Otherwise, work piece processing device 300 is the same as work piece processing device 100.

Figure 4:
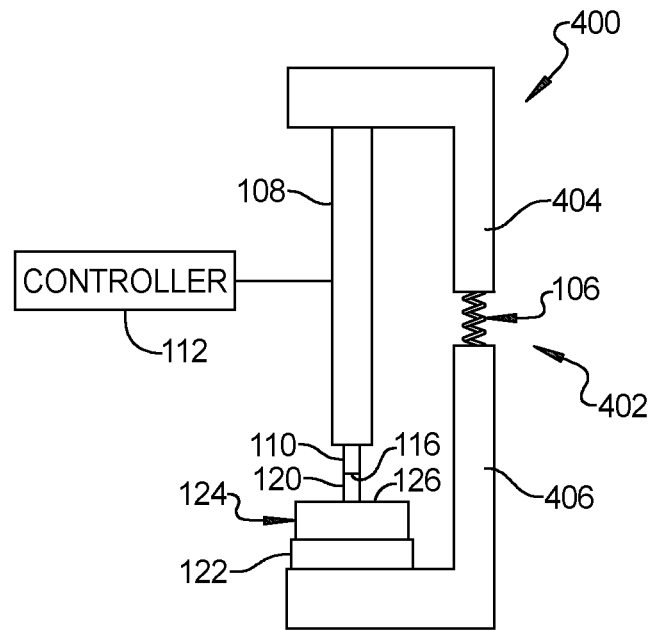

In FIG. 4, work piece processing device 400 has a frame 402 having an upper frame portion 404 (as oriented in FIG. 4) and a lower frame portion 406 with elastic member 106 disposed between upper frame portion 404 and lower frame portion 406. Work piece holder 122 is affixed to lower frame portion 406. Servo-motor 108 of servo-motor 108 is affixed to upper frame portion 404. Otherwise, work piece processing device 400 is the same as work piece processing device 100.

In operation, servo-actuator 104 moves tool device 120 into contact with work piece 124 and servo-actuator 104 will thus be pushing against the relatively non-compliant surface of work piece 124. When pushing against a relatively non-compliant surface, the ratio of force to position sensitivity of the servo-actuator is determined by the spring constant of the material being pushed upon. Having elastic member 106 in series with servo-actuator 104 in the force transmission path through which force is applied against the work piece 124 when the tool device 120 is brought into contact with work piece 124 adds an additional compliance to the system, which reduces the overall spring constant. This increases the force sensitivity of the servo-actuator 104 relative to its position. This allows the force to be controlled accurately with the servo-actuator 104 while maintaining accurate position control. The spring constant of the elastic member 106 is selected to provide a desired force to position fidelity.

In servo-elastic actuator system 102 when the work piece 124 is melted during operation such as in the case of ultrasonic welding or ultrasonic sealing, elastic member 106 will expand after servo-actuator 104 stops moving tool device 120, thus changing the position of elastic member 106 after movement of tool device 120 stops. That is, although the servo movement has stopped, tool device 120 continues to move due to the compression of elastic member 106. When the work piece 124 melts such as two parts being welded melt, the melt itself is being compressed or held until solidification. Reactive controls, discussed in more detail below, are used to compensate for this by countering this movement of elastic member 106. With this compensation, the accuracy of position is enhanced.

In embodiment, a simple algorithm using the spring constant of the elastic member 106 and the spring deflection is used to calculate the force being applied to work piece 122 when tool device 120 is brought into contact with work piece 122 by servo-actuator 104. The spring deflection is the amount in distance that elastic member 106 is deflected. A closed loop of this calculated force of the elastic member 106 controls the position of servo-actuator 104. By this means, precise control of the force being applied to work piece 124 can be achieved while simultaneously precisely monitoring position of the tool device 120.

Figure 9:
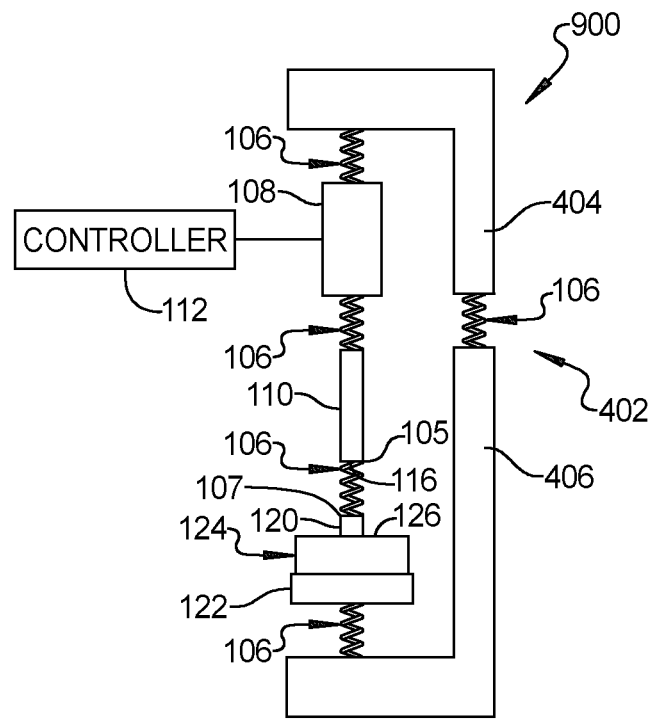

While springs and elastomers were discussed above as examples for elastic member 106, it should be understood that elastic member can be any type of member that has the requisite spring constant (linear or torsional as applicable), and can include combinations of elements such as a plurality of elastic members 106 positioned in different positions in the work piece processing device. FIG. 9 shows an example of a work piece processing device 900 having a plurality of elastic members 106 positioned in different positions in work piece processing device 900. In this example, the different positions are the positions described above with reference to FIGS. 1A, 1B-4. It should be understood that the plurality of elastic members could be positioned in other than all these positions. For example, the plurality of elastic members could be positioned in some but not all of these positions.

It should be understood that the work piece processing device could be configured so that the work piece holder is moved by servo-actuator 104 against tool device 120.

FIG. 5 shows a control diagram of exemplar control logic 500 for control of servo-motor 108 of servo-elastic actuator system 102. Control logic 500 is illustratively implemented in controller 112. The control logic 500 uses two position sensors 502, 504 (position encoders for example), to determine the spring deflection of elastic member 106. Position sensors 502, 504 are located in the work piece processing device so that they are on opposite sides of elastic member 106. By way of example and not of limitation and with reference to device 100 shown in FIG. 1, position sensor 502 senses the position of end 105 of elastic member 106 and position sensor 504 senses the position of end 107 of elastic member 106 as servo-actuator 104 moves tool device 120 into contact with work piece 124. The difference in the positions sensed by position sensors 502, 504 is determined by summer 506 which subtracts the position sensed by position sensor 504 from the position sensed by position sensor 502 with this difference being the spring deflection of elastic member 106. The force being applied to work piece 124 is calculated at 508 using equation 1 above and the force calculated at 508 input to a PID (proportional-integral-differential) controller 510. It should be understood that alternatively a PI (proportional-integral), P (proportional) or I (integral) controller could be used. A force set-point 512 is also input to PID controller 510. PID controller 510 controls servo-motor 108 and thus controls the position of servo-actuator 104 based on the calculated force (calculated at 508) of elastic member 106. It should also be understood that alternatively, any appropriate closed loop control methodology using the calculated or measured force could be used.

The position sensed by position sensor 504 is also used to limit the maximum travel of servo-actuator 104. A position set-point 514 is input to a summer 516 as is an overshoot distance compensation 518 and the position sensed by position sensor 504. Summer 516 subtracts the sum of the overshoot distance compensation 518 and the position sensed by position sensor 504 from position set-point 514 and stops servo-motor 108 when the sum of the position sensed by position sensor 504 and the overshoot distance compensation 518 exceed the position set-point 514. It should be understood that in additional to determining when to stop servo-motor 108, this determination can also be used to initiate or terminate processing, change target force or intensity, initiate retraction of servo-actuation 104, and the like. It should also be understood that these decisions can also be made based upon the calculated force (calculated at 508). In an aspect, overshoot distance compensation 518 is be determined using a test sample to measure an overshoot distance to use as the overshoot distance compensation, discussed in more detail below with reference to FIG. 9, or determined using an iterative method of past samples to estimate the overshoot distance compensation.

FIG. 6 shows a control diagram of control logic 600 for control of servo-motor 108 of servo-elastic actuator system 102 that is a variation of control logic 500 and only the differences will be discussed. A position sensor 602 disposed between opposed ends of elastic member 106, such between ends 105, 107 (FIG. 2) of elastic member 106, senses the spring deflection of elastic member 106 and is used to obtain the spring deflection of elastic member 106 instead of position sensors 502, 504. Position sensor 504 is still used in the control limiting the maximum travel of servo-actuator 104.

Figure 7:
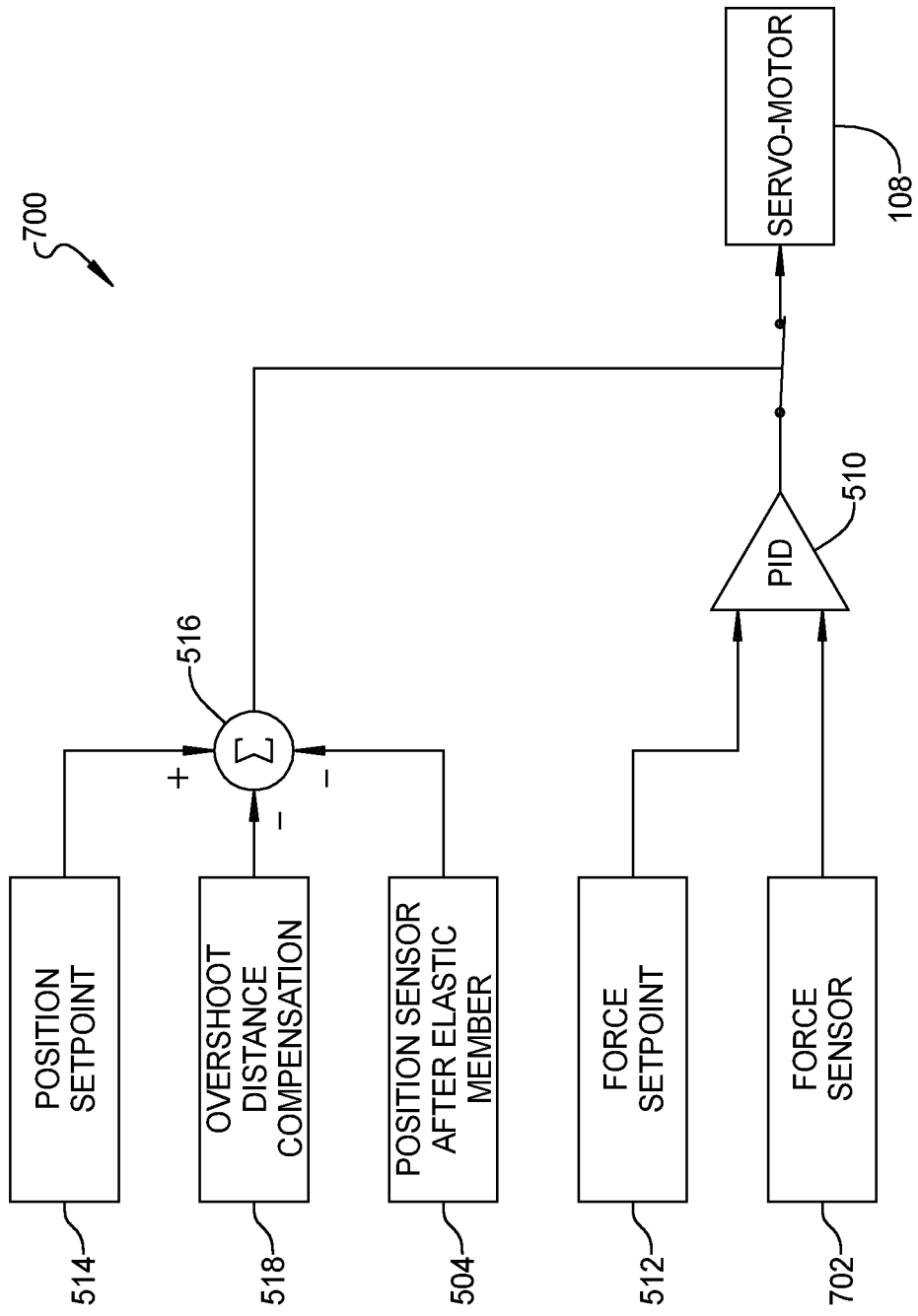

FIG. 7 shows a control diagram of control logic 700 for control of servo-motor 108 of servo-elastic actuator system 102 that is a variation of control logic 500 and only the differences will be discussed. Control logic 700 uses a force sensor 702 to obtain the force being applied to work piece 124 instead of calculating this force based on the spring constant of elastic member 106 and the spring deflection of elastic member 106. The force sensed by force sensor 702 is input to PID controller 510 in lieu of the force calculated at 508 in control logic 500 and control logic 700 thus also does not use position sensor 502. Position sensor 504 is still used in the control limiting the maximum travel of servo-actuator 104. Force sensor 702 is illustratively a torque sensor that senses torque applied between servo-motor 108 and actuator member 110.

Figure 8:
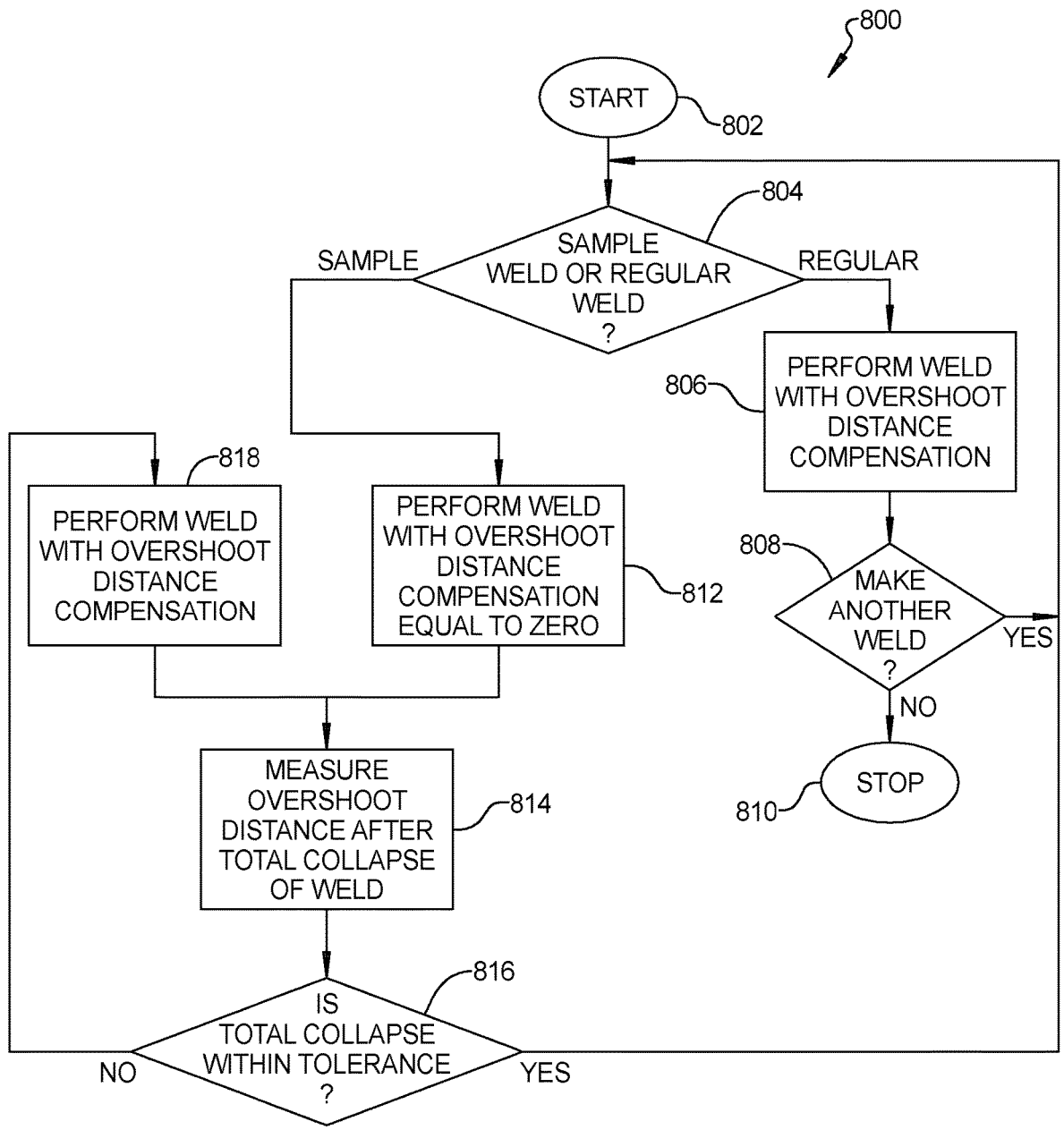

FIG. 8 shows a flow chart of control logic 800 for determining overshoot distance compensation 518 by using a test sample to measure an overshoot distance to use as the overshoot distance compensation 518. The following discussion is in the context of a work piece processing device that is a welder, such as an ultrasonic welder, but it should be understood that it is applicable to the other types of work piece processing devices. The control logic 800 starts at 802. At 804, the control logic 800 determines whether the work piece processing device is being used in the measurement of an overshoot distance using a sample weld or being used for a regular weld. In this context, a regular weld is the welding of the work pieces together for their intended use. If a regular weld, the control logic 800 branches to 806 where the work piece processing device is used for a regular weld where it performs the weld with the overshoot distance compensation 518 (as discussed above) and then branches to 808 where it determines whether the work piece processing device will be used to perform another weld. If so, the control logic 800 branches back to 804. If not, the control logic branches to 810 where it "stops" the work piece processing device—for example, idles the work piece processing device until it is used again. If at 804 the control logic determines that an overshoot distance to use as the overshoot distance compensation is to be measured using a sample weld, it branches to 812 where it performs a sample weld with the overshoot distance 518 compensation set to zero. At 814, an overshoot distance is measured after the collapse of the sample weld and set as the overshoot distance compensation 518. The control logic 800 then branches to 816 where the total collapse is compared to the desired collapse to see if it is in tolerance. If it is not, the control logic 800 branches to 818 where is performs a sample weld using the overshoot distance compensation 518. From 818, the control logic continues to 814, then to 816 again. If the total collapse is in tolerance of the desired collapse at 816, the control logic 800 branches to 804. In this way, control logic 800 hones into the desired overshoot distance 518 by successive iterations of sample welds.

Controller 112 can be or includes any of a digital processor (DSP), microprocessor, microcontroller, or other programmable device which are programmed with software implementing the above described logic. It should be understood that alternatively it is or includes other logic devices, such as a Field Programmable Gate Array (FPGA), a complex programmable logic device (CPLD), or application specific integrated circuit (ASIC). When it is stated that controller 112 performs a function or is configured to perform a function, it should be understood that controller 112 is configured to do so with appropriate logic (such as in software, logic devices, or a combination thereof), such as control logic 500, 600 or 700, and also control logic 800 as applicable. When it is stated that controller 112 has logic for a function, it should be understood that such logic can include hardware, software, or a combination thereof.

The above discussed elastic member 106, which will be referred to hereinafter as a compliance elastic member, can be affixed in such a way to run in the range of tension to compression. If the compliance elastic member is affixed in this way, the system can account for tooling and carriage load due to the weight of tooling (such as tool device 120 in FIGS. 1-4 & 9) and associated carriage components to which the tooling is affixed that carry the tooling as it is moved to and from the workpieces. For example as shown in the embodiment of FIG. 1, tool device 120 is affixed to end 107 of compliance elastic member 106. The weight of tool device 120 exerts a downward force on compliance elastic member 106 and in FIG. 1, tool device 120 is a supported component.

A problem with the above discussed servo-elastic actuator system 102 in that it is often impractical to have compliance elastic member 106 affixed for both tension and compression. If the compliance elastic member 106 is just in compression as in FIG. 10 or just in tension as in FIG. 11, the servo-elastic actuator system 102 cannot account for the weight of the tool device 124 and carriage load. Therefore, the minimum force that could be exerted by the servo-elastic actuator system 102 is equal to the tool device 124 and carriage load weight using just the compliance elastic member 106 in just a compression configuration or a tension configuration.

In embodiments of servo-actuator system 102 discussed above, a combination of two position sensors, or a position encoder, determines the compression or tension (spring deflection) of the compliance elastic member 106. The compression or tension along with the spring constant of the compliance elastic member determines the force exerted on the work piece 124 by servo-actuator 104. When the compliance elastic member 106 can only be in compression, the weight of the tool device 124 and carriage bottom out and therefore the servo-actuator system 102 cannot distinguish forces exerted on the workpiece 124 at forces below the weight load of tool device 124 and carriage. This situation is shown in FIGS. 10 and 11.

To address the foregoing, a servo-elastic actuator system 102' in accordance with an aspect of the present disclosure has a weight compensation elastic member 1200 in between the servo and the load to compensate for the weight of the load as shown in FIG. 12. In this way, the servo-elastic actuator system 102' can precisely control force down to zero while simultaneously precisely controlling position. Also, in an aspect, one or both ends of compliance elastic member 106 are not affixed to adjacent components of servo-elastic actuator system 102' in the serial force transmission path but simply abuts the adjacent component or components. For example, in the embodiment shown in FIG. 12, end 105 of compliance elastic member 106 abuts but is not affixed to mounting member 1202 which is affixed to actuator 10, end 107 of compliance member 106 abuts but is not affixed to mounting member 1204, or both. It should be understood that servo-elastic actuator system 102' is otherwise the same as servo-actuator system 102 (including any of its variations discussed above) and the following discussion will thus focus on the differences. It should also be understood that with these differences, servo-actuator system 102' can otherwise be any of the variations of servo-actuator system 102 described above.

The weight compensation elastic member 1200 is disposed in servo-actuator system 104' so that the spring forces exerted by the compliance elastic member 106 and the weight compensation elastic member 1200 are opposed to each other, as shown FIGS. 12-16. In this regard, the weight compensation elastic member is disposed so that its spring force exerts an upward force on the tooling and carriage load.

With the addition of the weight compensation elastic member 1200 opposed to the compliance elastic member 106 to compensate for the weight of the tooling and carriage load, the force to position sensitivity ratio is equal to the combination of the compliance elastic member 106 and the weight compensation elastic member 1200:

$$K=K_{compliance}+K_{compensating}=\Delta\text{force}/\Delta\text{position} \tag{3}$$

where:
K=spring constant of the combination of the compliance elastic member and the weight compensation elastic member;
$K_{compliance}$=spring constant of compliance elastic member;
$K_{compensating}$=spring constant of weight compensation elastic member;
Δforce=precision of force exerted by servo-actuator (the smallest amount of force that can be controlled);
Δposition=precision of position control (the smallest amount of distance that can be controlled);
and the total travel of the weight compensation elastic member 1200 has to account for the total tooling and carriage weight (total weight of the tooling and associated carriage components), and the total travel of the compliance elastic member 106 has to account for the total force that is exerted by the servo-actuator 104. That is, the weight compensation elastic member 1200 at full compression (or extension as applicable) has to account for the full effective weight of the tooling and carriage, and the compliance elastic member 106 at full compression (or extension as applicable) has to account for the total force exerted by the servo-actuator 104. The distance traveled by each of the compliance elastic member 106 and the weight compensation elastic member 1200 under full compression (or extension as applicable) is the same (Total Travel Distance) so:

$$(W_{carriage}+W_{tooling})*\cos(\theta)=k_{compensating}*(x-x_{preload}) \tag{4}$$

and, $$F_{Servo}=k_{compliance}*(x-x_{preload}) \tag{5}$$

where:
$W_{carriage}$=weight of carriage (in Newtons);
$W_{tooling}$=weight of tooling (in Newtons);
θ=angle between a direction that servo-actuator 104 is pointed and direction of gravity;
x=Total Travel Distance (in meters);
$x_{preload}$=slight extra travel distance (in meters) to ensure preloading of the compliance elastic member 106 and weight compensation elastic member 1200; and
$F_{servo}$ is the total force (in Newtons) exerted by servo-actuator 104.

By this combination of weight compensation elastic member 1200 and compliance elastic member 106, the servo-elastic actuator system 102' can precisely simultaneously control force and position, when the compliance elastic member 106 is only in compression or tension, while allowing the force to be determined to values down to zero. It should be understood that in an aspect, servo-elastic actuator system 102' is controlled with any of the control logic described above with reference to FIGS. 5-8 and in the case of the control logic described with reference to FIGS. 5 and 6, modified to utilize the spring constant for the combination of the compliance elastic member 106 and weight compensation elastic member 1200 as the spring constant.

It should be understood that the weight compensation elastic member 1200 and the compliance elastic member 106 can be any type of device having a spring force, such as a coil spring, a leaf spring, a conic spring, a pneumatic spring, or an elastomer. It should also be understood that the weight compensation elastic member 1200 can be in a compression configuration, or in a tension configuration.

Figure 15:
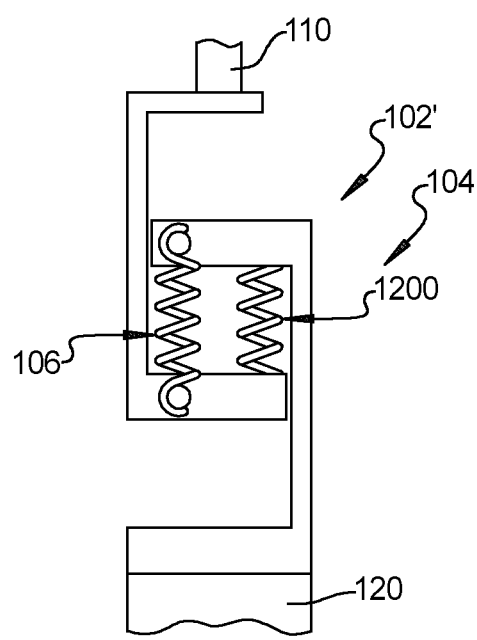
FIG. 15 is a portion of a work piece processing device having a servo-elastic actuator system with a compliance elastic member in tension only and a weight compensation elastic member in compression only in accordance with an aspect of the present disclosure.

In an aspect, there are four different combinations of compliance elastic member 106 and weight compensation elastic member 1200. The compliance elastic member 106 is in compression only and the weight compensation elastic member 1200 is also in compression only, as shown in FIG. 12, which is a preferred embodiment. The compliance elastic member 106 is in compression only, and the weight compensation elastic member 1200 is in tension only as shown in FIG. 13. The compliance elastic member 106 is in tension only, and the weight compensation elastic member is in tension only as shown in FIG. 14. The compliance elastic member 106 is in tension only, and the weight compensation elastic member is in compression only as shown in FIG. 15.

Illustratively, the compliance elastic member 106 and the weight compensation elastic member 1200 are configured together in a combination, referred to herein as elastic member combination 1600 (FIG. 16). Elastic member combination 1600 can be located at different locations in servo-elastic actuator system 102'. Elastic member combination 1600 can be located between the servo-actuator 104 and the tool device 120, as shown in FIG. 16, in which case, the weight compensation elastic member compensates for the weight of the tool device 120 and associated carriage components (not shown), which is a preferred embodiment as mentioned above. Elastic member combination 1600 can be located between the servo-actuator 104 and the frame 114 as shown in FIG. 17, in which case, the weight compensation elastic member 1200 compensates for the weight of the servo-actuator 104, tool device 120 and associated carriage components.

In a reversed situation, where the servo-actuator 104 is directed upwards and the compliance elastic member is located above the work piece holder 122 as shown in FIG. 18, illustratively between work piece holder 122 and frame 14. In this variation, the weight compensation elastic member 1200 compensates for the weight of the work piece holder 122.

It should be understood that servo-elastic actuator system 102' is useful where a servo-actuator pushes against a relatively non-compliant surface where both accurate force and position control are desirable. By way of example and not of limitation, servo-elastic actuator system 102' can be used for compliant for any ultrasonic process, such as welding, cutting, staking, and swaging. Servo-elastic actuator system 102' can also be used for laser welding, printing, cutting, staking or swaging, where the workpiece(s) being laser processed are clamped by the servo-actuator 104. The servo-elastic actuator system 102' can also be used for spin welding, vibration welding, and hot plate welding.

An advantage of adding weight compensation elastic member to a servo-elastic actuator system having a compliance elastic member is that force can be precisely controlled to a level below the weight of a supported component (s) while simultaneously precisely controlling position.

While the foregoing example embodiments of servo-elastic actuator system 102' shown in FIGS. 12-18 are shown as vertically oriented servo-elastic actuator systems with servo-actuator 104 oriented vertically so that actuator member 110 travels vertically up and down, it should be understood that servo-actuator system 102' can be other than vertically oriented. If servo-elastic actuator system 102' is other than vertically oriented, it would illustratively include a linear guide to counteract any non-axial components of a gravity vector. That is, any components of the gravity vector that are not axial with actuator member 110 of the servo-actuator 104. It should be understood that servo-elastic actuator system 102' that is vertically oriented may also include the linear guide.

FIG. 19 is an illustrative example of a servo-elastic actuator system 102" that is oriented at an angle between vertical and horizontal. Servo-elastic actuator system 102" is, with the following differences, the same as servo-elastic actuator system 102' shown in FIG. 16 and the following discussion focuses on the differences. Servo-elastic actuator system 102" has an angular orientation in that servo-actuator 104 including actuator member 110 and tool device 120 are aligned axially at a non-zero angle φ with respect to vertical, and also a non-zero angle with respect to horizontal. Servo-elastic actuator system 102" includes a linear guide 126 in which tool device 120 is received and which supports tool device 120 counteracting any non-axial components of the gravity vector.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A work piece processing device, comprising:
a tool device and a work piece holder; and
a servo-elastic actuator system having simultaneous precision force and position control that moves one of the tool device and the work piece holder to the other of the tool device and work piece holder;
the servo-actuator system including a servo-actuator, a compliance elastic member and a weight compensation elastic member disposed in a force transmission path with the compliance elastic member and the weight compensation elastic member disposed with respect to each other so that a spring force exerted by the weight compensation elastic member is opposed to a spring force exerted by the compliance elastic member and a force to sensitivity position ratio is equal to a combined spring constant that is a combination of a spring constant of the compliance elastic member and a spring constant of the weight compensation elastic member;
a controller coupled to the servo-actuator; and
the controller configured to determine a force being applied to a work piece held by the workpiece holder as the compliance elastic member is deflected based on a spring deflection of the compliance elastic member in combination with the weight compensation elastic member and simultaneously control force and position of the servo-actuator based on the combined spring constant.

2. The work piece processing device of claim 1 wherein the compliance elastic member is either in compression or tension and the weight compensation elastic member is also in either compression or tension.

3. The work piece processing device of claim 2 wherein the work piece holder is disposed below the servo-actuator and the compliance elastic member and the weight compensation elastic member are disposed between the servo-actuator and the tool device and the weight compensation elastic member is disposed to support a weight of the tool device.

4. The work piece processing device of claim 2 wherein the work piece holder is disposed below the servo-actuator and the compliance elastic member and the weight compensation elastic member are disposed between the servo-actuator and a frame of the work piece processing device and the weight compensation elastic member is disposed to support a weight of the servo-actuator and the tool device.

5. The work piece processing device of claim 2 wherein the work piece holder is disposed above the servo-actuator and the weight compensation elastic member is disposed to support a weight of the work piece holder.

6. The work piece processing device of claim 1 wherein the controller is configured to control movement of the servo-actuator to an end position based on the force being applied to the work piece and a force set-point, and controlling movement of the servo-actuator to maintain the force being applied to the work piece at the force set-point once the force being applied to the work piece reaches the force set-point.

7. The work piece processing device of claim 1 including, first and second position sensors disposed on opposite sides of the compliance elastic member in combination with the weight compensation elastic member and coupled to the controller, the controller configured to determine the spring deflection of the compliance elastic member in combination with the weight compensation elastic member based on positions sensed by the first and second position sensors as the compliance elastic member and weight compensation elastic member are deflected by movement of the servo-actuator.

8. The work piece processing device of claim 1 including a position sensor disposed between opposed ends of the compliance elastic member in combination with the weight compensation elastic member that senses the spring deflection of the compliance elastic member in combination with the weight compensation elastic member as the compliance elastic member and weight compensation elastic member are deflected, the position sensor coupled to the controller.

9. The work piece processing device of claim 6 including a force sensor coupled to the controller that senses the force being applied to the work piece.

10. The work piece processing device of claim 6 including a position sensor that senses a position of the servo-actuator, the position sensor coupled to the controller, the controller configured to limit maximum travel of the servo-actuator based on the position sensed by the position sensor and a position set-point.

11. The work piece processing device of claim 10 wherein the controller is configured to limit maximum travel of the servo-actuator based on an overshoot distance compensation as well as the position sensed by the position sensor and the position set-point.

12. The work piece processing device of claim 1 wherein the force transmission path is a linear force transmission path or a rotational force transmission path.

13. The work piece processing device of claim 1 wherein the work piece processing device is any of an ultrasonic welder, a vibration welder, a laser welder, a thermal welder, a spin welder, an infrared welder, or an ultrasonic cutter.

* * * * *